United States Patent

[11] 3,625,539

[72] Inventors Stephen J. Crouch
 Warwickshire;
 Peter W. R. Stubbs, Warwick; Michael W. Lewis, Warwick, all of England
[21] Appl. No. 851,392
[22] Filed Aug. 19, 1969
[45] Patented Dec. 7, 1971
[73] Assignee The Rover Company Limited
 Solihull, England
[32] Priority Aug. 20, 1968
[33] Great Britain
[31] 39,773/68

[54] VEHICLE SUSPENSIONS
 8 Claims, 3 Drawing Figs.
[52] U.S. Cl. ................................................. 280/112 R, 280/124 F
[51] Int. Cl. ..................................................... B60g 17/04
[50] Field of Search ............................................ 280/6, 112, 112.1, 124 F; 267/64 B, 65

[56] References Cited
UNITED STATES PATENTS

| | | | |
|---|---|---|---|
| 3,020,062 | 2/1962 | Reed | 280/112.1 |
| 3,089,710 | 5/1963 | Fiala | 280/112.1 |
| 3,194,581 | 7/1965 | Brueder | 280/112.1 |
| 3,227,466 | 1/1966 | Garcea et al. | 280/6 |

Primary Examiner—Duane A. Reger
Attorney—Scrivener, Parker, Scrivener and Clarke ABSTRACT: In an antiroll active vehicle suspension comprising hydraulic struts in series with springs, preferably gas springs, with the flow of fluid to and from the struts controlled by control units responsive to lateral acceleration. The struts for all the wheels on each side of the vehicle are controlled by a single unit common to that side of the vehicle. Where the vehicle is a road vehicle with steered front wheels the control units are near the front of the vehicle and respond to a feedback signal from the suspension linkage of the adjacent front wheel. The feedback signal is preferably through a spring and damper in parallel. There can be damping restrictions between the struts and air springs, and in pipes interconnecting the hydraulic systems of the different struts.

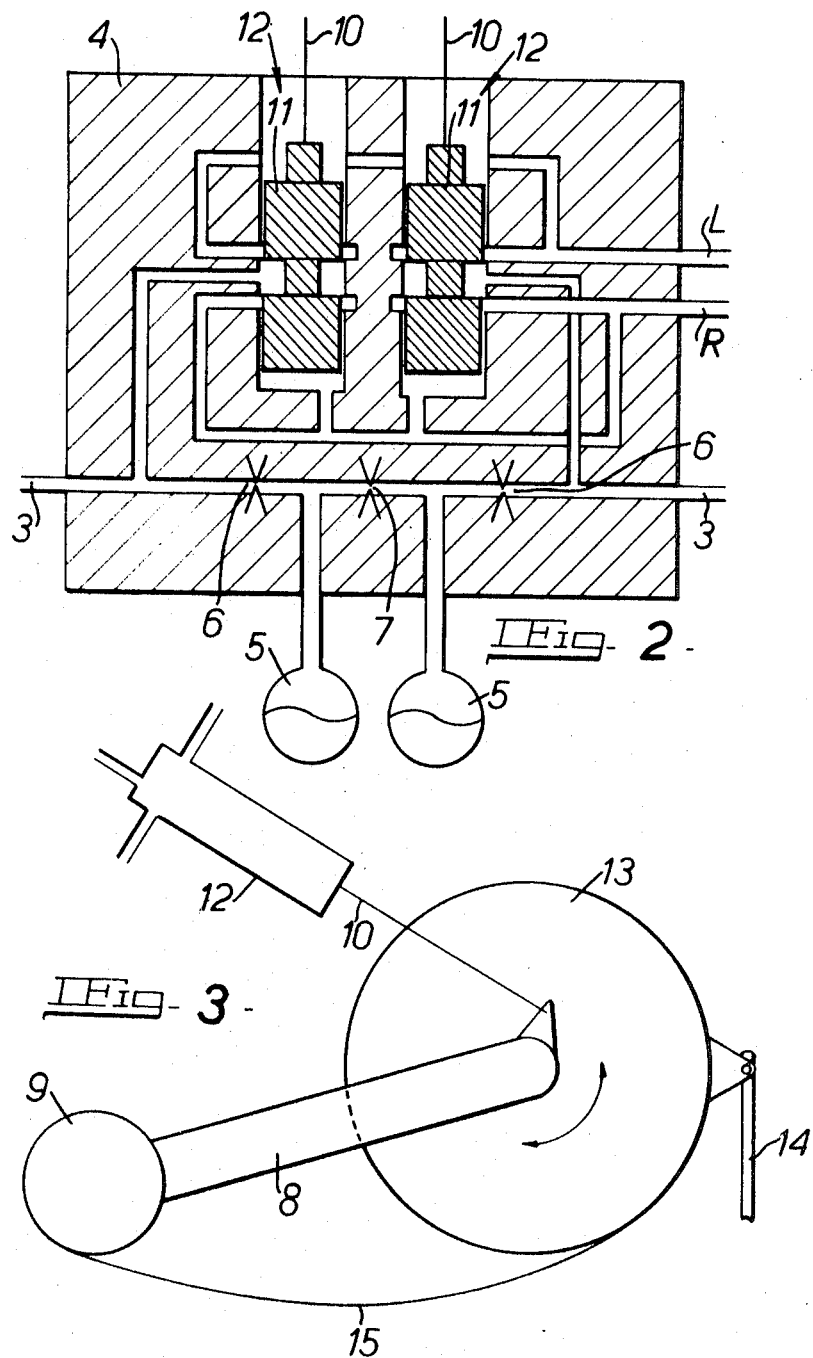

VEHICLE SUSPENSIONS

This invention relates to suspensions for vehicles, primarily for road vehicles such as passenger cars, although it may also be applicable to other forms of vehicle including rail vehicles and even track-laying vehicles.

It is generally true that all the many suspension linkages that have been proposed and used are essentially compromises between a number of conflicting factors. Thus a front suspension soft enough to give a good ride may adversely affect steering behavior. One that produces no change in camber or in track during bump deflections can result in a roll center height that produces poor cornering characteristics. In particular, although there is no problem in designing a suspension linkage that produces no roll at all, or even an inward tilt, on cornering, such a suspension is ruled out in practice by its unacceptable behavior in other respects.

Those suspensions which incorporate automatic leveling or self-leveling features give the designer of the linkage the advantage that suspension movements on bump and rebound always occur about a known mean datum, regardless of substitute therefor load, and because the total suspension travel to be allowed for can be less than in nonself-leveling systems, compromises in the geometry of the linkage can be made that a linkage which has acceptable springing and steering characteristics necessarily allows at least some degree of roll on cornering. This is especially true of a passenger saloon car, where the suspension must be reasonably soft and where furthermore the center of gravity cannot be unduly low.

Yet to obtain good handling characteristics from a motor vehicle requires that the roll angle be small, even in violent maneuvers. A small roll angle can be obtained by raising the height of the roll center and increasing the roll stiffness but a high roll center implies tire scrub on bumps and a high roll stiffness produces a bad ride due to high wheel-to-body spring rates.

A primary aim of the present invention is to provide a vehicle suspension in which roll is opposed. The roll can if desired even be made negative, i.e., so that the body of the vehicle tilts inwards on curves.

According to the invention a multiwheel two-track vehicle has a suspension system comprises suspension units acting on each of the wheels in the form of springs in series with hydraulic struts of variable length, acting between the vehicle bodywork and wheels, all the hydraulic struts on each side of the vehicle being interconnected and controlled by a common control unit associated with one side of the vehicle, each control unit serving to add or withdraw fluid to or from its associated struts in a manner such as to resist or counteract rolling movement of the vehicle bodywork with respect to the wheels about a longitudinal axis of the vehicle.

By suitable selection of the dimensions and response of the control units it is possible to eliminate roll altogether, or even make it negative, i.e., to cause the body to tilt inwards on bends.

The invention is primarily concerned with controlling roll about a longitudinal axis. Normal suspension movements on passing over bumps are controlled in an orthodox manner by the springs that are effectively in series with the struts. However the springs need not be directly connected mechanically in series with the struts. On the contrary, where they are gas springs, they can be in the form of bodies of gas trapped in containers separated from the hydraulic fluid by a flexible diaphragm and can be mounted at a point remote from the associated suspension linkage. The incorporation of restrictions in the hydraulic fluid lines can then eliminate the need for separate dampers connected to the linkage.

The invention is applicable primarily to a four-wheeled road vehicle, with the front wheels steered, in which case the control units are preferably mounted, one on each side, near the front of the vehicle.

The invention will now be further described by way of example with reference to the accompanying drawings, in which:

FIG. 2 shows the valve block which forms part of the hydraulic circuit; and

FIG. 3 shows the control unit in diagrammatic form.

Figure 1:
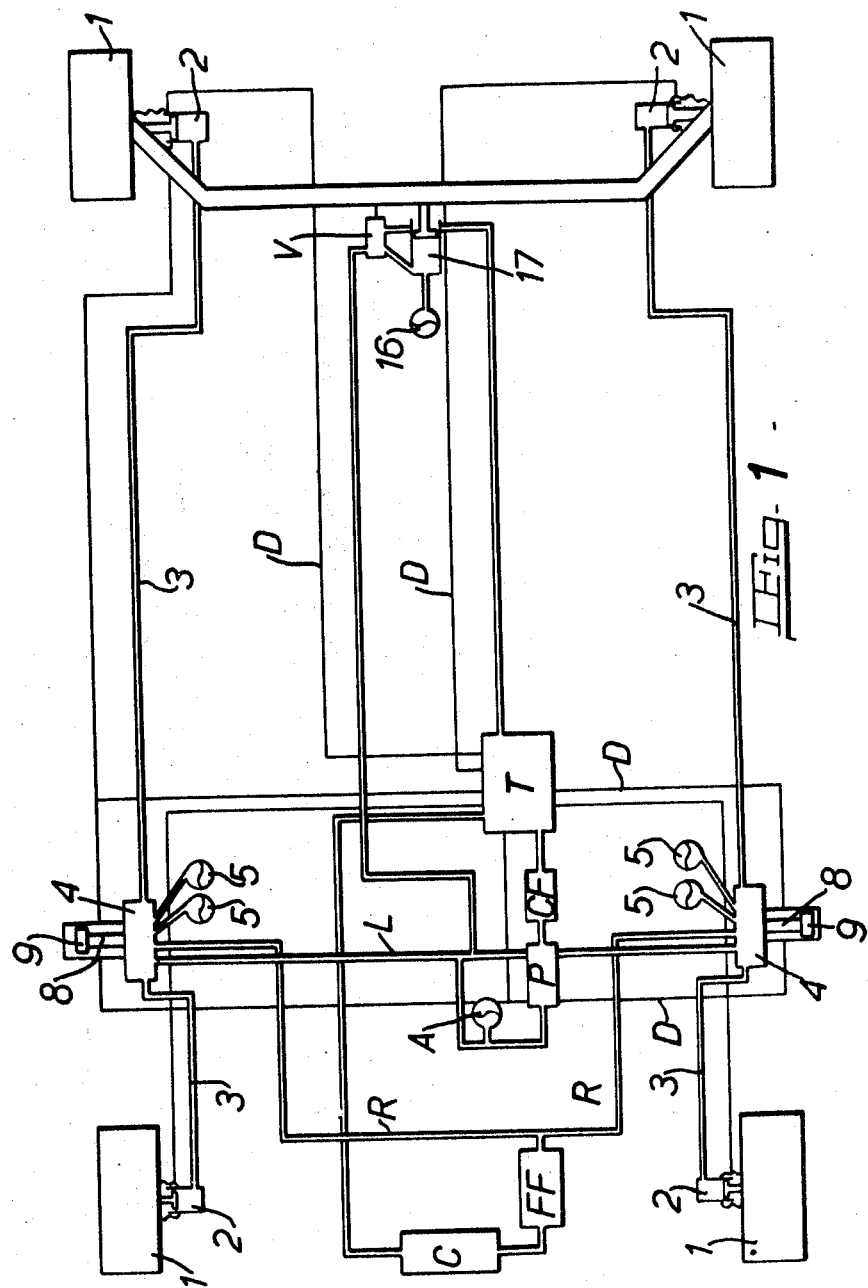
FIG. 1 is a diagrammatic layout of the system, although with certain details omitted for simplicity.

For purposes of illustration the invention is shown applied to a four-wheeled vehicle and the layout shown is suitable for a passenger saloon motor car, but it will be understood that it may be modified to suit other vehicles, for example those having three or more axles.

Each of the four wheels 1 is connected to the bodywork of the vehicle through a suspension linkage, the details are not shown as they are unimportant, but may include independent front suspension units including a pair of wishbone links mounting the front wheels and a solid axle arrangement for the rear wheels. However it is worth bearing in mind that, by virtue of the present invention, which takes care of rolling movement, the designer of the mechanical linkage of the suspension has greater freedom than hitherto, in that he does not need to incorporate antiroll characteristics in the geometrical layout of the linkage.

At a convenient point between a moving part of each linkage and the bodypart or chassis (the 'sprung' part of the vehicle) there is incorporated a hydraulic strut in the form of a piston-and-cylinder unit 2 alternatively, a diaphragm type or strut instead of a sliding piston could be utilized. The two struts on each side of the vehicle are connected through pipes 3 to a common valve block 4 associated with that side. A pump P drawing liquid through a coarse filter CF from a main reservoir tank T supplies high-pressure hydraulic fluid to the two valve blocks through a line L, pressure fluctuations being damped out by an air spring A. The pump is of a variable-delivery constant-pressure kind and its details are unimportant. Any other constant-pressure variable-delivery source would serve equally well, for example a hydraulic accumulator fed by an intermittently running pump. The return line R from the valve blocks takes the fluid through a fine filter FF and a cooler C back to the tank T. Zero-pressure drain lines, taking any leakage fluid from the struts and valve blocks back to the tank, are shown in single lines at D.

Associated with each of the four struts 2 there is a respective gas spring of known kind in the form of a globe 5 with a diaphragm separating a trapped volume of gas (for example, dry nitrogen) from the hydraulic fluid. However, as there is no necessity for the springs to be mounted close to the suspension linkages they are for convenience connected to the valve blocks 4.

As shown in FIG. 2, the pipes 3 from the front and rear struts are connected to their respective springs 5 through damping restrictions, indicated diagrammatically at 6. These restrictions, by opposing the flow of fluid between the strut and the spring on normal suspension movements as the associated wheel passes over a bump or hole, perform the function of dampers and make the provision of a separate hydraulic damper on the suspension linkage unnecessary. Moreover the hydraulic circuits between the front and rear struts on the same side of the vehicle are interconnected through a further restriction 7, which thus allows a certain amount of interchange, i.e., at a restricted rate. This gives characteristics in pitch similar to those of known interconnected fluid-controlled suspensions, in that a bump movement at the front wheel on one side will cause a limited degree of lifting action by the rear wheel on the same side.

The manner in which roll is controlled will now be described. Each valve block is mounted near the front of the vehicle on the respective side which it is to control and near each valve block there is a pendulum device of the kind illustrated diagrammatically in FIG. 3. The device comprises a pendulum arm 8 pivoted about an axis which, in the example described, extends horizontally parallel to the fore-and-aft longitudinal axis of the vehicle. The end of the arm carries a bob-weight 9, and the arm is also connected through a link 10 to the valve spools 11 of the valves 12 in the adjacent valve block 4. One of these valves controls the supply of hydraulic fluid to the front strut and the other controls the supply to the rear strut. It will be observed that the connections to the respective pipes 3 are direct, i.e., not through the damping restrictions 6, and for this reason it is necessary to use two separate valves to avoid direct communication between the struts, bypassing the restrictions, when the valve spools 11 are in the neutral position. In this neutral position, the flow of hydraulic fluid to or from the struts is cut off, and each forms a suspension spring unit, together with its associated gas spring 5. When the valve spool moves one way fluid is admitted from the high-pressure line L to extend the strut and when it moves the other way fluid can pass from the strut to the return line R, shortening the strut.

The pendulum arm 8 extends, in the example shown, at an angle to the horizontal, the exact value of which will depend on various design factors, and can move a few degrees from its mean position. It is secured to the spindle of a rotary damper 13, for example of the viscous fluid type, the body of which is mounted rotatably on the bodywork, i.e., the 'sprung' part, of the vehicle; the body of the damper is connected by a link 14 to any convenient point in the suspension linkage of the associated front wheel that will transmit suspension movements to the damper body. Finally, the damper body is connected directly to the bob-weight 9 through a leaf spring 15 that forms effectively a resilient link. Thus suspension movements are transmitted to the pendulum arm through the rotary damper itself and through the resilient link 15, acting in parallel.

When the front wheel of the vehicle passes over a bump the suspension linkage will have an upward movement imparted to it, which will act through the damper and the resilient link 15 to try to turn the arm 8 in a counterclockwise direction as seen in FIG. 3. However that same suspension linkage, acting through the spring 5 modified by the restriction 6 in the pipe 3, will simultaneously be imparting an upward acceleration to the bodywork on which the spindle of the damper is carried, and the effect of inertia is such that this will tend to cause the arm 8 to turn in a clockwise direction with respect to the bodywork. Thus, by making the damper-spring combination 13, 15 a replica in miniature of the damper-spring combination 6, 5, we can, and do, arrange that there is no net movement of the arm 8 with respect to the bodywork on normal suspension movements, and the valve members 11 remain in their neutral positions, so no fluid is added to or withdrawn from the suspension system. The angular movement of the arm 8 is small, even for full opening of the valves 12, and so small changes in leverage because of this movement can be neglected.

On the other hand, when the vehicles goes round a bend, the bob-weight 9 will be subjected to horizontal accelerating forces which are not opposed and which will cause the arm 8 to turn, displacing the valve members from the neutral positions and admitting fluid to, or withdrawing it from, the associated struts both at the front and at the rear of the associated side of the vehicle, such as to cause extension or contraction of the struts to resist roll. Thus if the struts are those of the wheels that are on the outside of the bend they will be extended and simultaneously those on the inside will be contracted, so that the body will remain substantially upright.

Theoretically, therefore, if there is exact and instantaneous correction of the roll there will be no movement of the suspension linkage with respect to the bodywork. In practice it is necessary to allow a certain amount of relative roll in order to provide a small feedback signal through the link 14 in order to ensure stability. However, in a normal road vehicle equipped with pneumatic tires the tires themselves will deflect as a result of the weight transfer to the outside wheels on a bend, and so we can arrange the feedback loop of the system so that, as far as the bodywork-suspension linkage is concerned, there is a slight overcorrection, so that the bodywork tilts inwards slightly with respect to the suspension linkage, enough to compensate for the deflection of the tires and keep the vehicle bodywork exactly horizontal in relation to the ground while still providing a finite movement through the link 14 to control the pendulum arm 8.

The construction of the preferred form of the pendulum/damper units illustrated in FIG. 3 forms the subject of our copending patent application Ser. No. 851,245.

In a modification (not shown) the arm 8 of the pendulum unit could be horizontal. It would then not respond directly to horizontal accelerations arising when the vehicle goes round a bend, but the start of the outward rolling movement of the bodywork with respect to the wheels will transmit a signal to it through the link 14 that can be used to actuate the valves to oppose the roll. However, there must be a finite positive roll signal in this case, so it cannot eliminate but only reduce the roll, and also the response is slower as the correction does not start until some roll has already taken place, and it will be appreciably greater before the correction starts to take effect.

The system described above is concerned with opposing roll, although it has been shown that it also takes over the function of the dampers in normal suspensions. Also, although the connections between the front suspension linkages and the control units will result in automatic correction of the height of the front of the vehicle due to changes in the load at the front, there will be no automatic height correction following changes in the load on the rear axle. Accordingly we provide an additional spring 16 and hydraulic strut 17 acting on the midpoint of the rear axle of the vehicle, the length of the strut being controlled by a valve V sensing the relative distance between the bodywork and the axle and supplying fluid to, or exhausting it from, the strut to keep this distance approximately constant. This levelling method is known; it incorporates the usual delay to avoid unnecessary response to short-term displacements as a result of normal suspension movements.

It is worth emphasizing here that in the main suspension described above there is no delay, in fact the behavior depends on substantially instantaneous response in order to oppose or eliminate roll. In this connection it will be observed that there is no restriction in the flow of fluid between each valve 11 and its associated strut as it bypasses the damper restriction 6. Yet this restriction acts as a damper to normal bump and rebound movements of the suspension; acting effectively in parallel with the air spring but in series with the strut.

It will also be observed that, unlike normal fluid suspensions that correct continuously for height, the system according to the invention makes no heavy demand on the vehicle's engine as a source of power for pumping the fluid, as it consumes no fluid at all during straight-ahead travel, regardless of pitching movements, and the demand for pumping only arises during the negotiation of curves. By controlling all the wheels on one side of the vehicle through a common control unit we simultaneously reduce the cost and complication as compared with the use of four (or more) independent suspension and control units, and solve the problem of instability that arises as soon as more than three mutually independent units are used. Also we ensure a constant distribution of the antiroll forces between the front and rear of the vehicle. This distribution need not be even but can be adjusted as desired by suitable selection of the diameters and land spacings in the two valves 12 of each valve block. In this way we can control the relative roll couples at the front and rear and thereby control the handling characteristics of the vehicle as desired.

In the system described, because there is no substantial time delay, deflection of the front suspension linkages when the car decelerates on braking (brake dive) or when the car accelerates (squat) will result in changes in the lengths of the struts in directions such as to correct these movements, but the same changes will occur also in the rear struts because of the common control, and so the whole vehicle will tend to be raised or lowered on its suspension. To overcome this we may incline the axes of the pendulums, either so that they are still horizontal but are inclined to a transverse line, or so that they are inclined to the horizontal, in such a way that inertia forces on the pendulums as a result of brake dive or squat act in a way which opposes the force on the pendulums caused by the deflection of the suspension linkages, so that in practice there is no movement of the pendulums on braking or acceleration. This further reduces the consumption of hydraulic fluid.

Instead of a mechanically moving pendulum acting on valves, it would be possible to substitute other acceleration-sensitive devices, such as electrical transducers, the signals from which could be amplified to act on solenoid valves controlling the flow of fluid to and from the struts, provided satisfactory valves are obtainable at reasonable cost.

We claim:

1. In a vehicle having a body and a plurality of wheels arranged in two tracks, a suspension system comprising suspension units acting between said vehicle body and said wheels, each said suspension unit including a pressure fluid strut to and from which pressure fluid may flow to vary the loading thereof and spring means in series with said strut, said flow of pressure fluid to said pressure fluid struts arranged in one of said tracks being controlled by a control unit mounted on said vehicle body, each said control unit including valve means for controlling said flow of pressure fluid to vary the loading of said struts associated therewith to resist rolling movement of said vehicle body, and each said control unit further including an inertial mass mounted for responsive rotational movement to horizontal acceleration forces and arranged to actuate said valve means on said responsive movement.

2. A suspension system according to claim 1 wherein each said control unit is mounted on said vehicle body adjacent one of said wheels, said one wheel is mounted on a suspension linkage, said suspension linkage is connected to said control unit by means arranged to transmit suspension movements.

3. A suspension system according to claim 2 wherein each said control unit includes a pressure fluid passageway interconnecting said pressure fluid struts associated with said control unit, and said passageway includes a damping restriction.

4. A suspension system according to claim 3 wherein said spring means of each said suspension unit comprises a gas spring, each gas spring of said suspension units in one of said tracks is connected to said passageway in said associated control unit, and said passageway includes further damping restrictions interposed between said first mentioned damping restriction and said valve means.

5. A suspension system according to claim 4 wherein said inertial mass is mounted on a rotary damper having a horizontal axis, said rotary damper having a body rotatably mounted on said vehicle body and said means connected to said suspension linkage is arranged to transmit suspension movements to said damper body, said rotary damper having a spindle on which said inertial mass in mounted and acting between said damper body and said inertial mass in parallel is further spring means.

6. A vehicle suspension system according to claim 5 wherein said inertial mass comprises a pendulum, and said valve means of each said control unit comprises a pair of spool valves, said spool valves being operable connected to said pendulum by actuating means that move the spool valves linearly in response to angular movement of said pendulum.

7. A vehicle suspension system according to claim 6 wherein said control units are connected to a common source of pressure fluid, and said spool valves in each said control unit are mounted in a valve block, said valve block including a passageway for conducting pressure fluid from said common source to said valve spools, and including a passageway for conducting pressure fluid from said valve spools to a common return conduit.

8. A vehicle suspension system according to claim 7 wherein each said control unit is mounted adjacent the front wheels of said vehicle, and at the rear of said vehicle means are provided for sensing the relative distance between the rear wheels and said vehicle body, said means controls the supply of pressure fluid to and from a pressure fluid strut arranged to maintain said relative distance substantially constant, and said means being connected to said common source of pressure fluid.

* * * * *